United States Patent
Ziegler

(10) Patent No.: US 9,237,082 B2
(45) Date of Patent: Jan. 12, 2016

(54) PACKET DESCRIPTOR TRACE INDICATORS

(75) Inventor: Michael L. Ziegler, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 164 days.

(21) Appl. No.: 13/430,265

(22) Filed: Mar. 26, 2012

(65) Prior Publication Data

US 2013/0250777 A1   Sep. 26, 2013

(51) Int. Cl.
*H04L 12/26* (2006.01)

(52) U.S. Cl.
CPC ............... *H04L 43/10* (2013.01); *H04L 43/12* (2013.01); *H04L 43/106* (2013.01)

(58) Field of Classification Search
CPC ..................... H04L 29/06183; H04L 12/2634; H04L 12/2487
See application file for complete search history.

(56) References Cited

U.S. PATENT DOCUMENTS

| | | | |
|---|---|---|---|
| 6,324,657 B1 * | 11/2001 | Fister et al. | 714/42 |
| 6,625,662 B1 * | 9/2003 | Satoh et al. | 709/250 |
| 6,782,498 B2 * | 8/2004 | Tanizaki et al. | 714/733 |
| 6,934,281 B2 * | 8/2005 | Kanehara | 370/353 |
| 7,107,202 B1 * | 9/2006 | Hegde et al. | 703/22 |
| 7,230,915 B2 * | 6/2007 | Kobayashi | 370/226 |
| 7,268,573 B2 * | 9/2007 | Jang et al. | 324/762.01 |
| 7,324,454 B2 * | 1/2008 | Horinouchi et al. | 370/242 |
| 7,447,222 B2 | 11/2008 | Wakumoto et al. | |
| 7,554,977 B2 | 6/2009 | Parizhsky et al. | |
| 7,609,629 B2 * | 10/2009 | Watanabe et al. | 370/230 |
| 7,882,438 B2 * | 2/2011 | Markham et al. | 715/736 |
| 7,903,555 B2 | 3/2011 | Navada et al. | |
| 7,952,512 B1 * | 5/2011 | Delker et al. | 342/42 |
| 8,170,061 B2 * | 5/2012 | Abe et al. | 370/474 |
| 8,327,187 B1 * | 12/2012 | Metcalf | 714/10 |
| 2002/0032871 A1 * | 3/2002 | Malan et al. | 713/201 |
| 2002/0105911 A1 * | 8/2002 | Pruthi et al. | 370/241 |
| 2005/0094568 A1 * | 5/2005 | Judd | 370/242 |
| 2006/0013141 A1 * | 1/2006 | Mutoh et al. | 370/241 |
| 2006/0184690 A1 | 8/2006 | Milliken | |
| 2006/0268913 A1 * | 11/2006 | Singh et al. | 370/412 |
| 2007/0276938 A1 * | 11/2007 | Ottamalika et al. | 709/224 |
| 2008/0015422 A1 * | 1/2008 | Wessel | 600/301 |
| 2008/0244739 A1 | 10/2008 | Liu et al. | |
| 2009/0274245 A1 * | 11/2009 | Brown et al. | 375/340 |
| 2010/0241744 A1 * | 9/2010 | Fujiwara | 709/224 |
| 2010/0250497 A1 * | 9/2010 | Redlich et al. | 707/661 |
| 2010/0256470 A1 * | 10/2010 | Miller | 600/324 |

(Continued)

OTHER PUBLICATIONS http://ieeexplore.ieee.org/search/srchabstract.jsp?tp=&arnumber=1494507&queryText%3[ "IP Traceback Based on Packet Marking and Logging" Gong, C. et al., May 16-20, 2005.

(Continued)

*Primary Examiner* — Ian N Moore
*Assistant Examiner* — Phong La
(74) *Attorney, Agent, or Firm* — Hewlett Packard Enterprise Patent Department

(57) ABSTRACT

Techniques are provided to trace packet descriptors. A received packet may be identified. A packet descriptor associated with the received packet may be created. A trace indicator in the packet descriptor may be set. The presence of a packet descriptor with the trace indicator set may be logged by a detector.

15 Claims, 6 Drawing Sheets

(56) References Cited

U.S. PATENT DOCUMENTS

2011/0258685 A1* 10/2011 Qiu et al. .......................... 726/5
2012/0076153 A1* 3/2012 Manzella et al. ............. 370/419

OTHER PUBLICATIONS http://portal.acm.org/citation.cfm?id=611410, "Single-packet IP Traceback" Snoeren, A.C. et al., Dec. 2002.

* cited by examiner

| DETECTOR | PRESENT | TIMESTAMP | RESULT | DESCRIPTION |
|---|---|---|---|---|
| 1 | YES | 300 ns | | HIGH PRI. INPUT |
| 2 | NO | | | MEDIUM PRI. INPUT |
| 3 | NO | | | LOW PRI. INPUT |
| 4 | YES | 305 ns | QUEUE 8 | MIRROR |
| 5 | NO | | | OTHER |
| 6 | NO | | | HIGH PRI. OUTPUT |
| 7 | NO | | | MEDIUM PRI. OUTPUT |
| 8 | YES | 310 ns | | LOW PRI. OUTPUT |
| 9 | YES | 320 ns | | OUTPUT |
| ... | ... | ... | | |

Columns: 310, 330, 350, 340, 320

FIG. 3

| DETECTOR | PRESENT | TIMESTAMP | COUNT | DESCRIPTION |
|---|---|---|---|---|
| 1 | YES | | 25 | HIGH PRI. INPUT |
| 2 | YES | | 26 | MEDIUM PRI. INPUT |
| 3 | YES | | 25 | LOW PRI. INPUT |
| 4 | NO | | 0 | MIRROR |
| 5 | YES | | 76 | OTHER |
| 6 | NO | | 0 | HIGH PRI. OUTPUT |
| 7 | YES | | 76 | MEDIUM PRI. OUTPUT |
| 8 | NO | | 0 | LOW PRI. OUTPUT |
| 9 | YES | | 76 | OUTPUT |
| ... | ... | ... | ... | |

PACKET DESCRIPTOR TRACE INDICATORS

BACKGROUND

Data networks are used to allow many types of electronic devices to communicate with each other. Typical devices can include computers, servers, mobile devices, game consoles, home entertainment equipment, and many other types of devices. These types of devices generally communicate by encapsulating data that is to be transmitted from one device to another into data packets. The data packets are then sent from a sending device to a receiving device. In all but the simplest of data networks, devices are generally not directly connected to one another.

Instead, networking devices, such as switches and routers, may directly connect to devices, as well as to other networking devices. A network device may receive a data packet from a device at an interface that may be referred to as a port. The network device may forward the data packet to another port for output to either the desired destination or to another network device for further forwarding toward the destination.

BRIEF DESCRIPTION OF THE DRAWINGS

FIG. 3 is an example of log data.
FIG. 4 is another example of log data.

DETAILED DESCRIPTION

Figure 1:
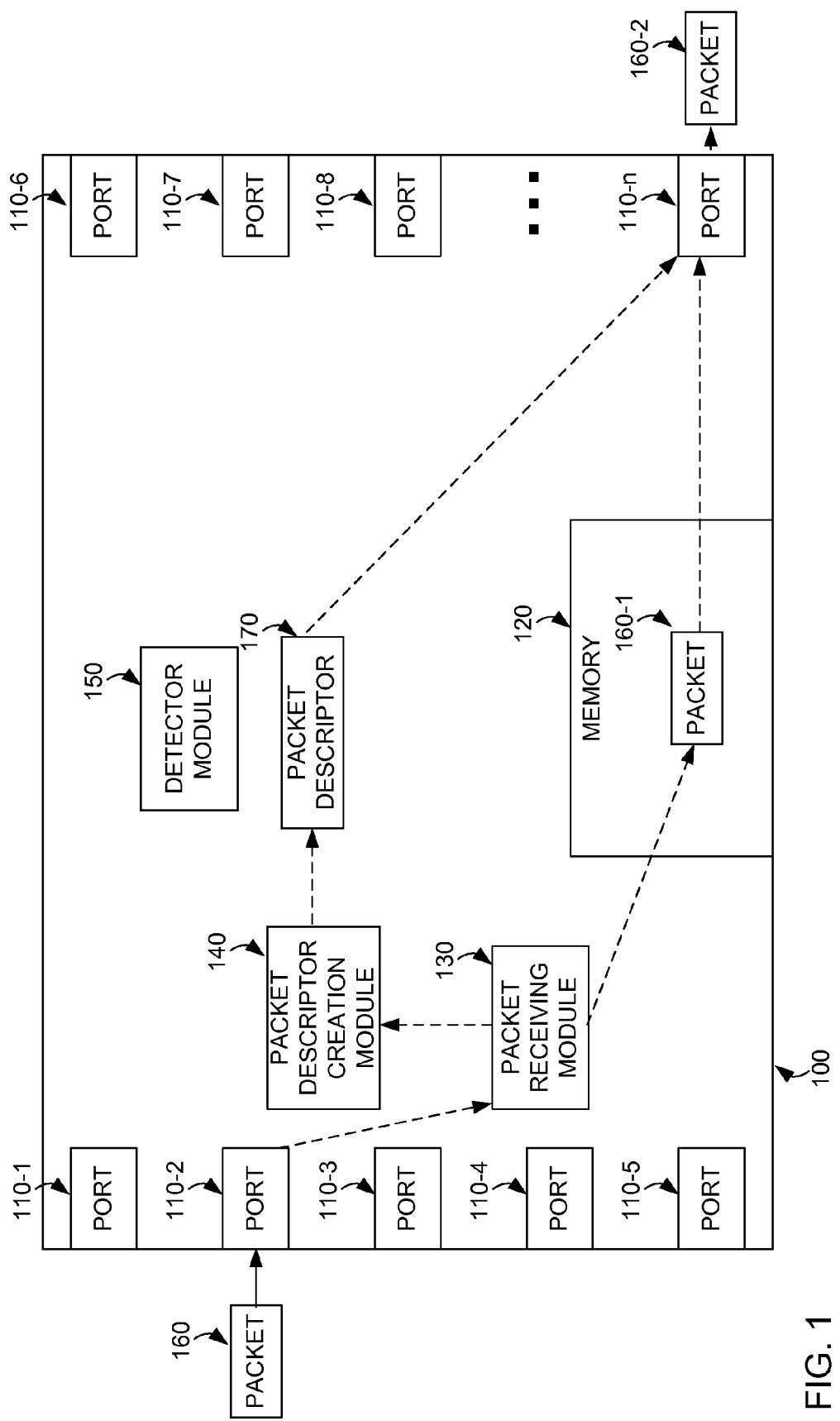
FIG. 1 is a high level example of a device.

At times, it may be desirable to trace the route a packet takes as it travels from a source to a destination. One level of tracing may include starting at the source node, logging any intermediate networking devices, and ending at the destination node. There are many tools available to perform such tracing. One example is the trace route program which is useful to identify the path a packet may take from a source to a destination. Another level of tracing may be more narrowly focused on an individual networking device. As mentioned above, a packet may be received at one port of a networking device and output on a different port. Because the packets entering and leaving the ports are visible external to the networking device, it is a relatively simple matter to monitor the ports of a networking device and observe packets as they enter and exit the various ports. In some cases, to simplify the task, an indicator may be included in the packet, such as in the packet header. Monitoring the network device can be performed by port monitoring software that looks for the indicator in the packet header.

The packet tracing described above occurs on packets that are visible to an observer or observing software that is external to the networking device. However, there is yet another level of packet tracing that may be needed and that is packet tracing within the device itself. Although networking devices were described above as simply receiving a packet on one port and outputting the packet on a different port, the actual internal processing may be significantly more complex. A networking device may be receiving vast numbers of packets a second. These packets may need to be prioritized such that packets with higher priority are output before packets with lower priority. In addition, extra processing on a packet may be performed. For example, a packet may be mirrored to a monitoring port. The configuration of a networking device may determine the path a packet takes through the networking device. To verify proper configuration of the networking device, it would be desirable to trace the internal path a packet takes through the networking device.

The packet tracing techniques described above are not useful in tracing packets within a networking device as the internal processing is not typically observable from outside of the networking device. Further exacerbating the problem is the fact that networking devices typically do not manipulate the actual packet itself during internal processing. Packets are generally variable in size. Moving a variable sized packet through various internal processing steps becomes difficult to implement in hardware because the size of a packet cannot be known in advance. Even if the size of the packet was known in advance, the amount of processing activity and memory space involved in moving the full packet would be inefficient. To overcome this problem, a networking device may use a fixed size packet descriptor to represent the packet. The networking device may then process the packet descriptor as opposed to the packet itself. Although the use of a packet descriptor may overcome the problem of variable size packets, it introduces a new problem in that information contained in the packet itself cannot easily be used in the tracing process. Furthermore, including extra data in the packet to indicate the packet should be traced requires alteration of the packet. Such alteration may cause the packet to behave differently within the networking device. Furthermore, in the case of an operating networking device, there may be no ability to alter the incoming packets to include a trace indicator. Thus, including a trace indicator in the packet itself is of little benefit even when possible.

For example, a packet may be received at a networking device. The packet may be stored in a memory and a packet descriptor created. The packet descriptor may contain a pointer to the location in memory storing the packet. From then on, the majority of internal processing occurs on the packet descriptor. Some number of processing steps may use data contained in the packet itself, and for those steps the actual packet may be accessed. If a trace indicator were included in the packet, accessing such a trace indicator would mean that the packet in memory would need to be accessed upon every processing step. Such an access would require additional time and would thus modify the behavior of the networking device. In other words, the process of observing the behavior of the networking device would itself alter the behavior of the device, rendering the observations of little value.

Techniques described herein overcome the above mentioned problems through the use of packet descriptors with trace indicators. When a packet is inserted into the networking device, a determination may be made as to if the packet descriptor associated with the packet is to be traced. Tracing the packet descriptor through the networking device allows a user to verify that the networking device is properly configured to achieve the behavior desired by the user. If it is determined that the packet descriptor is to be traced, a trace indicator within the packet descriptor may be set.

Detector modules may be placed at locations of interest within the networking device. The detector modules may be configured to examine the packet descriptors and determine if the trace indicator is set. If the trace indicator is set, the detector module may log certain information about the packet descriptor, including the fact that the packet descriptor was observed by the detector.

The data logged by the detector modules may be retrieved by a user. By analyzing the data provided by the detector modules, it may be determined which detectors observed a packet as it made its way through the networking device. The actual path taken by the packet descriptor may then be compared to the path that would be expected based on the desired configuration of the network device. A match indicates the networking device is configured as intended. A mismatch may indicate that the networking device is incorrectly configured.

FIG. 1 is a high level example of a device. FIG. 1 depicts an example of a networking device that may utilize the techniques described herein. The networking device 100 may include ports 110-1 . . . n, a memory 120, a packet receiving module (PRM) 130, a packet descriptor creation module (PDCM) 140, and a detector module (DM) 150.

The networking device may receive packets 160 from external sources via the ports. Through the ports the network device may connect to other network devices or to end devices, such as computers. One common technology used in networking devices is Ethernet, and the ports may be Ethernet ports. However, the techniques described herein are not dependent on any particular networking technology. The ports may operate at various data rates, such as 1, 10, or 100 Gigabits(Gb)/Second (s). Once again, the techniques described herein are not dependent on the speed of operation of the ports.

Networking device 100 may also include a memory 120. The memory may be of any suitable type. For example, the memory may be static or dynamic random access memory (SRAM/DRAM), flash memory, or any other type of memory that is able to store data. The networking device may also include a packet receiving module (PRM) 130. The packet receiving module may receive a packet from one of the ports or other sources. The other sources will be described with respect to FIG. 2. The PRM may receive the packet and store the packet in the memory 120.

The networking device 100 may also include a packet descriptor creation module (PDCM) 140. As described above, the networking device may use packet descriptors to represent a packet as the packet moves through the networking device. Thus, instead of operating on the packet itself, the networking device may manipulate the packet descriptor. The PDCM may be responsible for creation of the packet descriptor. In addition, the PDCM may set a trace indicator within the packet descriptor if the packet is to be traced. Setting of the packet descriptor is described in further detail with respect to FIG. 2.

The networking device 100 may also include a detector module (DM) 150. The detector module may be placed at locations of interest within the networking device. For example, a DM may be included at the entry point of a queue within the networking device. When a packet descriptor with a trace indicator set is observed or "seen" by a DM, the DM may log the presence of the packet descriptor. In some implementations, the DM may also log additional details, such as a timestamp when the packet descriptor was seen. In some implementations, the DM may maintain a count of the number of packet descriptors with the trace indicator set that have been seen.

In operation, a packet 160 may be received at a port 110-2. The packet may be destined for port 110-n. The packet may be sent to the packet receiving module 130. The PRM may then store the packet 160-1 in the memory 120. In addition, the PRM may notify the packet descriptor creation module 140 that the packet 160 has been received. The PDCM may then create a packet descriptor 170 to represent the packet. Included in the packet descriptor may be a pointer to the actual packet that has been stored in the memory 120. In addition, the packet descriptor may contain a trace indicator. The PDCM may set the trace indicator if the path of the packet descriptor through the networking device is to be traced.

The networking device may then proceed to route the packet descriptor to the output port. An example of the processing that may occur when routing the packet descriptor is presented with respect to FIG. 2. For now, assume that processing the packet descriptor includes moving the packet descriptor from one queue to another in preparation for output. The networking device may include detector modules placed at various locations within the networking device. When a packet descriptor that has the trace indicator set is seen by a detector module, the detector module may log the presence of the packet descriptor.

After the packet descriptor arrives at the output port, or more correctly the output queue associated with the output port, the packet descriptor may be examined to determine the location in memory of the actual packet. For example, the pointer in the packet descriptor may be retrieved to determine the location in memory that contains the actual packet. The packet 160-2 may then be output through port 110-n.

Figure 2:
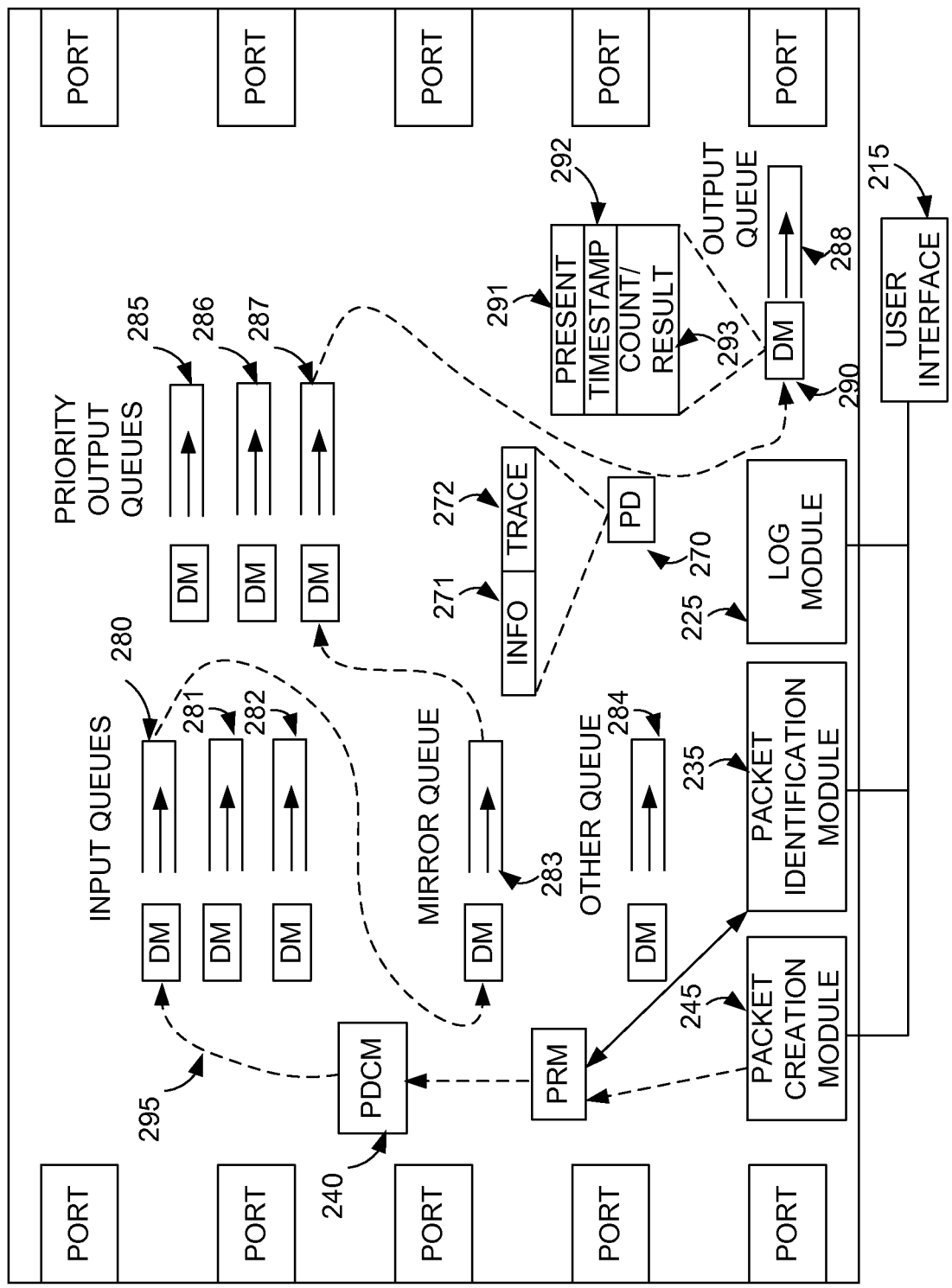
FIG. 2 is another high level example of a device.

FIG. 2 is another high level example of a device. The device shown in FIG. 2 is generally the same as that shown in FIG. 1. However, for purposes of clarity, some details, such as the memory have been omitted. Furthermore, additional details to further explain the techniques described herein are provided. FIG. 2 includes, in addition to the elements described in FIG. 1, a user interface 215, a log module 225, a packet identification module 235, and a packet creation module 245. In addition, the networking device in FIG. 2 includes input queues 280-282, mirror queue 283, other queue 284, priority output queues 285-287, and output queue 288. Each of these output queues may be associated with a detector module.

User interface 215 may be a system through which the user interacts with the networking device. Typically the user interface will be included in a device such as a desktop or laptop computer. However, the user interface may also be included in a mobile device, such as a smartphone or other such device. Regardless of the form, it is through the user interface that the user communicates with the networking device. Communication can include providing information for use in tracing packets through the networking device or in retrieving the results of such traces.

The networking device may include a log module 225. The log module 225 may be operably coupled to all of the detector modules within the networking device. For purposes of clarity of depiction, connections between the various detector modules and the log module have been omitted. However, it should be understood that the detector modules are able to convey data to the log module. Furthermore, the log module may be used to instruct the detector modules to reset, and thus clear any previously logged data.

The networking device may also contain a packet identification module 235. The description above was in terms of a single packet arriving at a port of the networking device. However, in an operational device, there may be vast numbers of packets arriving every second. Through the packet identification module, the user may be able to specify which packet or packets are to be traced. Using the user interface, the user may specify criteria for packets to be traced. For example, the user may specify a packet coming from a particular source or of a particular protocol should be traced. As packets are received by the PRM, the packets may be sent to the packet identification module. The packet may then be compared to the user specified criteria. If there is a match, this indicates that the packet descriptor associated with the packet is to be traced. As such, the packet descriptor creation module may be informed that the trace indicator should be set when the packet descriptor is created.

The networking device may also include a packet creation module 245. In the description above, packets were received from external sources and compared to user specified criteria. In an example implementation, the dependency on packets being received from external sources may be omitted. A user may still specify the criteria for a packet to be traced using the user interface and the networking device may create a packet matching the user criteria. The packet may be created by the packet creation module. The ability to independently create a packet may be useful in situations when there is no external source of packets. For example, when a new networking device is being installed, it may be desired to ensure proper operation prior to placing the device in service. By testing the device using created packets, it may be possible to ensure that the device will behave properly once it is placed in service. In addition, the use of created packets may simplify operation for the user. A user may make configuration changes to the networking device and may then immediately create a packet to test the configuration changes. Furthermore, it is possible that software may interact with the user interface. The ability to create a packet may simplify the automation of the process of making configuration changes and immediately verifying the effects of those changes.

As mentioned above, when a packet is received or created, a packet descriptor is created. Packet descriptor 270 is an example of a packet descriptor. The packet descriptor may include an INFO field 271. The INFO field may include information related to the packet such as the source, destination, protocol, size, and other such information. The INFO field may also include a pointer to the location in memory of the packet that is associated with the packet descriptor. In addition, the packet descriptor may include a trace indicator 272. The trace indicator may be set by the packet descriptor creation module 240 and is used by the detector modules when determining if the presence of a packet descriptor should be logged. For example, a set trace indicator may indicate the packet descriptor should be traced, while an unset (i.e. clear) indicator means that the packet descriptor should not be traced.

Detector modules may be placed at various locations of interest within the networking device. As will be described further below, the device may include several queues of different types. Each of these queues may be associated with a detector module. When a packet descriptor is added to one of the queues, the detector module may examine the packet descriptor. If the trace indicator in the packet descriptor is set, the detector module may log the presence of the packet descriptor. For example, detector module 290 may be associated with output queue 288. Whenever a packet descriptor is placed in output queue 288, the detector module may determine if the trace indicator is set. If so, the detector module may log certain information. One piece of information that may be logged is simply that the packet descriptor was present 291 at the detector module. Some other example information that may be logged is the timestamp 292 which indicates the time the packet was seen by the detector module. Another example piece of information that may be logged is the count/result 293. When a count field is used, the count may maintain the number of packet descriptors with the trace indictor set that have been seen by the detector module. When utilized as a result field, the result may indicate the result of a processing step. For example, a detector module may be placed at a processing step whose purpose is to select and assign the packet descriptor to another queue. The result field may be used to store the queue that was selected for assignment of the packet descriptor. As mentioned above, the detector module is coupled to the log module 225. The information logged by the detector module may be retrieved by the log module and presented to the user through the user interface. Examples of the retrieved data and its uses are described below.

In the preceding description, several references to queues have been made. As described above, there may be many internal processing steps within a network device that are generally not visible external to the networking device. Packet descriptors, which represent packets, may be moved from one processing step to the next as the packet descriptor makes its way from the input port to an output port. These processing steps may be represented by queues. In one sense, a queue may be thought of as a list of packet descriptors awaiting a particular processing step. When the packet descriptor arrives, it may be placed at the end of the queue. As prior packet descriptors are processed and leave the queue, the added packet descriptor may move forward in the queue. Eventually the packet descriptor may reach the head of the queue and is processed.

In another sense, a queue may be thought of as an individual processing step. In other words, the queue may be a list of packet descriptors that is limited in size to a single packet descriptor. Thus, a packet descriptor arriving in such a queue is immediately processed. The specific queues or processing steps described below are merely examples to aid in understanding of the techniques described herein. What should be understood is that the various queues and processing steps occur internally to the networking device and are generally not observable outside of the networking device, absent the techniques described herein.

The networking device may include input queues 280-282 which are high, medium, and low priority input queues, respectively. The network device may be configured such that incoming packet descriptors are assigned to the queues based on their characteristics. For example, packets using real time protocols may be assigned to a high priority input queue. Packets for protocols that are less sensitive to latency may be assigned to a medium priority input queue. Packets for protocols that are not especially sensitive to latency may be assigned to a low priority input queue. The networking device may be configured such that packets are de-queued from the greatest priority input queue until it is empty, then moves on to the next lower priority queue.

The network device may also include a mirror queue 283. The purpose of the mirror queue may be to duplicate a packet to a maintenance port. In this example description, the mirror queue may also select to which priority output queue the packet descriptor is assigned. The network device may be configured to send packets with certain characteristics to the mirror queue. Likewise, the network device may include an "other" queue to represent some generic processing. Just as with the mirror queue, packets with certain characteristics may be sent to the other queue. The networking device may also include high, medium, and low priority output queues 285-287, respectively. Just as with the input queues, packets may be assigned to output queues based on their sensitivity to latency. The network device may also include an output queue 288 that is associated with an output port. The output queue may receive packets from the priority output queues and output those packets on the output port.

As should be clear, an arriving packet, represented by a packet descriptor, may take a certain path through the networking device. For example, the packet may arrive and be placed in the high priority input queue 280. It may be determined that the packet should be mirrored, and is thus sent to the mirror queue 283. In the example shown in FIG. 2, the packet does not need "other" processing, such that the other queue 284 is bypassed. The packet may then be placed in the low priority output queue 287. Finally, the packet may be placed into the output queue 288 associated with the output port. The dashed line 295 generally indicates the path of the packet through the networking device.

As mentioned above, each of the queues may be associated with a detector module. The detector module is able to log the presence of the packet descriptor representing the packet based on the trace indicator included in the packet descriptor. The information collected from the detector modules may be sent to the log module. The user may then retrieve the information to analyze the path of the packet descriptor, and hence the packet, through the network device. Further description of the log data is presented with respect to FIG. 3.

The various modules and elements described in FIGS. 1 and 2 may typically be implemented in hardware. Due to the processing speed requirements needed in today's networking environment, the modules and elements may generally be implemented as an application specific integrated circuit (ASIC). The ASIC may contain memory, general purpose processors, and dedicated control logic. The various modules that are described may be implemented using any combination of the memory, processors, and logic as needed.

FIG. 3 is an example of log data. As described above, the log module may collect data from the detector modules that are placed at locations of interest within the networking device. FIG. 3 depicts an example of the data that may be logged. The data may include a detector identifier 310. The detector identifier may identify the particular detector for which data is being reported. In conjunction with the detector identifier may be a detector description 320. The detector description may be a user understandable description of the location of a particular detector. As shown in FIG. 3, detectors 1-3 may be associated with the high, medium, and low priority input queues. Detector 4 may be associated with a mirror queue while detector 5 may be associated with an "other" queue. Detectors 6-8 may be associated with high, medium, and low priority output queues, while detector 9 is associated with the port output queue. Although several example descriptions have been provided, it should be understood that these are examples. Detectors may be included at any location of interest within the networking device and the corresponding descriptions may describe those locations of interest.

The log data may also include a present field 330. The present field may be a Boolean yes/no type field. In some implementations, the present field may be implemented as a single bit. The present field may identify if a packet descriptor with the trace field set passed through the given detector. As mentioned above, in some implementations, a single packet is inserted into the networking device and allowed to exit from one of the ports. The log is then retrieved. All of the detectors may then be reset. Thus, the present field may determine through which detectors the packet descriptor passed. In conjunction with the present field may be a result field 340. The result field may contain the result of a particular processing step. For example, if a processing step selects one of a number of different outcomes for a packet descriptor, the result field may include the outcome that was selected.

The log data may also include a timestamp 350. In some implementations, the detectors may, in addition to logging the presence of a packet descriptor, log a timestamp of when the packet descriptor was present. In and of itself, a timestamp at any individual detector may not provide a significant amount of information. However, when combined with timestamps from all other detectors, the time stamp may be used to gain a better understanding of latency within the networking device.

Analyzing the log data may reveal the path that the packet descriptor, and thus the packet, takes through the networking device. For example, based on the data shown in FIG. 3, it may be determined that the packet descriptor was seen at detectors 1, 4, 8, 9. Thus, it can be determined that the packet descriptor was in the high priority input queue (detector 1), the mirror queue (detector 4), the low priority output queue (detector 8) and the port output queue (detector 9). Based on the user's knowledge of the networking device, the user may determine that the packet descriptor traversed the above mentioned detectors in the order presented. For example, the user may know that the general flow of a packet descriptor is from input, to processing, to output. Thus, based on the detectors that were triggered, the user is able to determine the path of the packet descriptor. Furthermore, the result field may be used to record the results of a given processing step. As mentioned above, the mirror processing step may select the priority of the output queue to which the packet descriptor will be added. Shown in the results field for detector 4, which is associated with the mirror queue, is an indication that the queue associated with detector 8, the low priority output queue, was selected. The result field may contain the result of the particular processing that was performed.

The inclusion of the timestamp may allow a more detailed analysis of the path of the packet descriptor. As shown, the timestamps indicate when the packet descriptor was seen at a given detector. Thus, by placing the log data in order by timestamp, the path of the packet descriptor through the detectors may be determined without any reliance on the user's knowledge of the networking device. In addition, the timestamp may allow the user to determine latency within the networking device. As shown, the packet descriptor was seen at detector 1 at time stamp 300 nanoseconds (ns). The packet descriptor was next seen at timestamp 305 ns at detector 4. Thus, it can be inferred that there is a delay of 5 ns from arrival at the high priority queue to arrival at the mirror queue. The timestamp field may be used by the user to determine the latency between the detectors. Although the above description appears to have a packet descriptor traverse detectors in a numerically increasing order, it should be understood that this was for ease of description. What should be understood is that the detector modules may simply record the presence of the packet and the timestamp when the packet was observed. Ordering by the timestamp may allow a user to determine the actual path a packet descriptor takes through the networking device, and that path may not necessarily be in any particular expected sequence of detectors.

FIG. 4 is another example of trace data. In the description above, the detectors may have been reset after each individual packet. However, in some implementations, the detectors may not be reset after each packet. Instead, the count field 440 may maintain a count of the number of packet descriptors with the trace indicator set that have been seen by the detector. Upon receipt of such a packet, the count for the detector may be incremented. In some implementations, the timestamp field may be omitted. In other implementations, the timestamp field may identify the timestamp of the arrival of the most recently arrived packet descriptor.

Maintaining the count of the number of packet descriptors received may be useful in verifying the proper configuration of the networking device. For example, the networking device may be configured such that packet descriptors are evenly divided amongst a plurality of queues. In terms of the present description, assume the networking device has been configured such that packet descriptors are to be evenly divided between the high, medium, and low priority input queues. By examining the count fields of the detectors associated with those queues, it can be verified that the networking device is operating as configured. It would be expected that each queue would receive roughly the same number of packet descriptors. As shown, the count fields for the high, medium, and low priority input queues contain roughly the same number of detected packet descriptors. Thus, it can be verified that the networking device is operating as configured.

Figure 5:
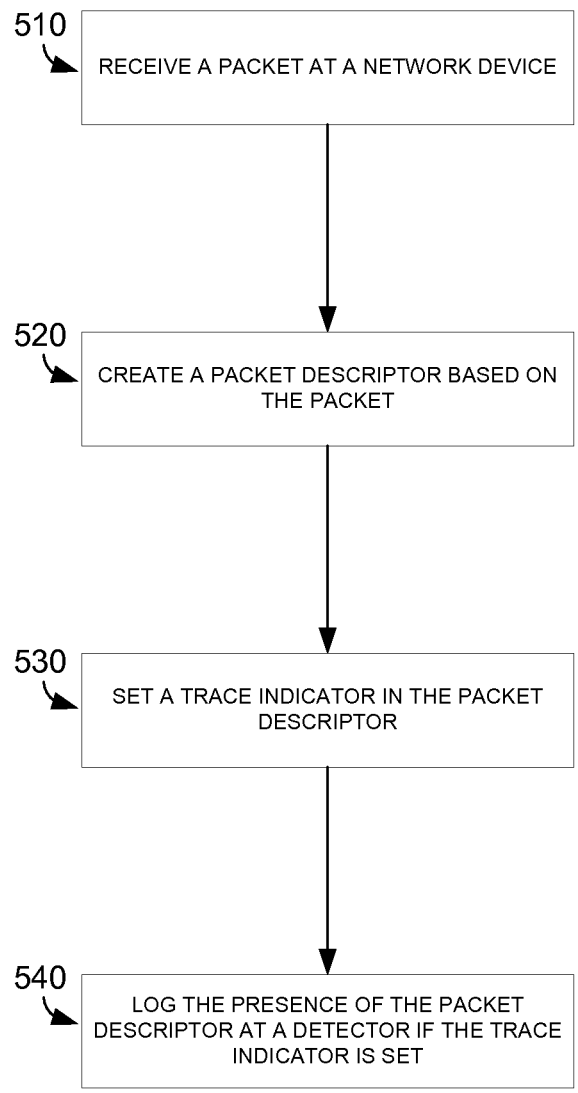
FIG. 5 is an example of a flow diagram for tracing a packet descriptor.

FIG. 5 is an example of a flow diagram for tracing a packet descriptor. In block 510 a packet may be received. For example, the packet may be received from an external source, such as a user interface system, or from another networking device. The packet may also have been created by the networking device itself. In block 520 a packet descriptor may be created based on the received packet. As explained above, the packet descriptor may be the representation of the packet as it moves through the networking device, without requiring movement of the data representing the packet itself.

In block 530 a trace indicator in the packet descriptor may be set. The trace indicator may be used to determine if an individual packet descriptor is to be traced or not. In block 540 the presence of the packet descriptor at a detector may be logged if the trace indicator is set. Detectors may be placed at locations within the networking device of interest, such as at input and output queues, processing queues, or any other such location. Logging the presence of the packet descriptor at those locations may be used to determine the path of the packet descriptor, and hence the packet, followed through the locations of interest.

Figure 6:
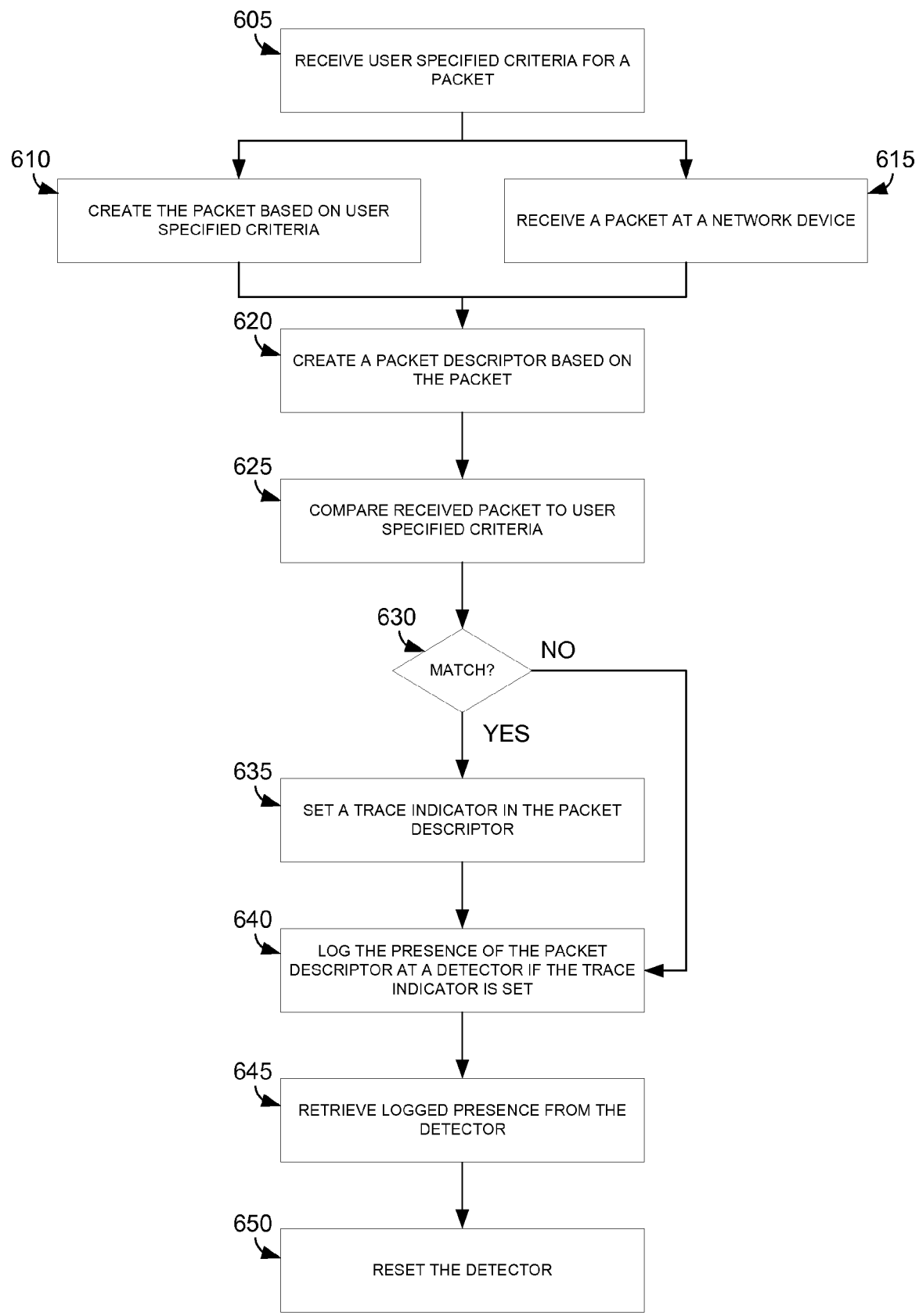
FIG. 6 is an example of a flow diagram for determining a packet to trace and tracing a packet descriptor.

FIG. 6 is an example of a flow diagram for determining a packet to trace and tracing a packet descriptor. In block 605 user specified criteria for a packet may be received. The user specified criteria may describe the type of packet the user wishes to trace through the networking device. The packet may come from an external source through one of the ports. Or, the packet may be generated by the networking device itself. In the case where the packet is created by the networking device, the process moves to block 610. In block 610 a packet may be created based on the user specified criteria. In the case where the packet comes from an external source, the process moves to block 615. In block 615 a packet may be received at the networking device.

In block 620 a packet descriptor based on the packet may be created. As described above, a packet descriptor may be used to represent the packet as it moves through the networking device without having to manipulate the packet itself. In block 625 the received packet may be compared to the user specified criteria. In block 630 it may be determined if the user specified criteria matches the received packet. If the packet was created based on the user specified criteria in block 610, there will be a match. In addition, if the packet received in block 615 matches the user specified criteria, there will be a match. In either of these two case, the process moves to block 635. Otherwise the process moves to block 640, which is described below.

In block 635 a trace indicator in the packet descriptor may be set. Because of the comparison in block 630, it may have been determined that this packet descriptor should be traced. Setting the trace descriptor in block 635 activates the tracing. In block 640 the presence of a packet descriptor with the trace indicator set may be logged at a detector. In some case, the logging may include adding a timestamp or incrementing a counter.

In block 645 the logged presence from the detector may be retrieved. As described above, if a packet descriptor is logged at a detector, this means that the packet descriptor passed through the location of interest within the networking device that is associated with the detector. Analysis of the detectors at which the packet descriptor was logged may be used to determine the path of the packet descriptor, which represents the packet, through the networking device. In block 650 the detector may be reset. In some cases, the tracing function may occur on a packet by packet basis. Thus, after logging the path of an individual packet through the networking device, all detectors may be reset in preparation for observing the next packet.

Figure 7:
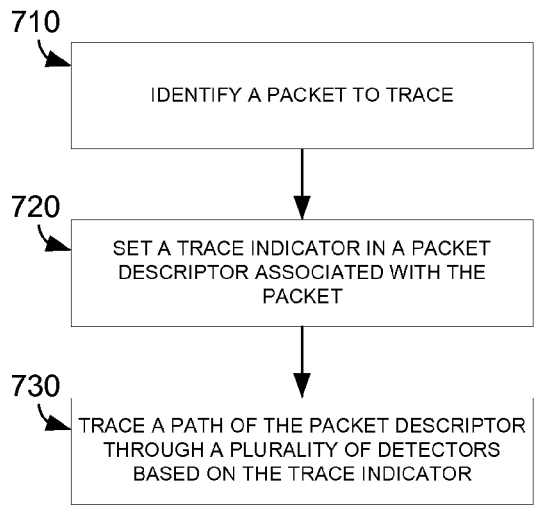
FIG. 7 is an example of a flow diagram for tracing the path of a packet descriptor.

FIG. 7 is an example of a flow diagram for tracing the path of a packet descriptor. In block 710 a packet to trace may be identified. In block 720 a trace indicator in a packet descriptor associated with the packet may be set. As explained above, a packet descriptor may represent a packet as it moves within the networking device, such that the actual packet need not be moved around within the networking device.

In block 730 the path of the packet descriptor through a plurality of detectors may be traced based on the trace indicator. As described above, detectors may be placed at locations of interest within the networking device. A detector may determine if the packet descriptor's presence should be logged based on the trace indicator. By logging the presence at a plurality of detectors placed at locations within the networking device, the path of the packet descriptor, and hence the packet, through the networking device may be determined.

Figure 8:
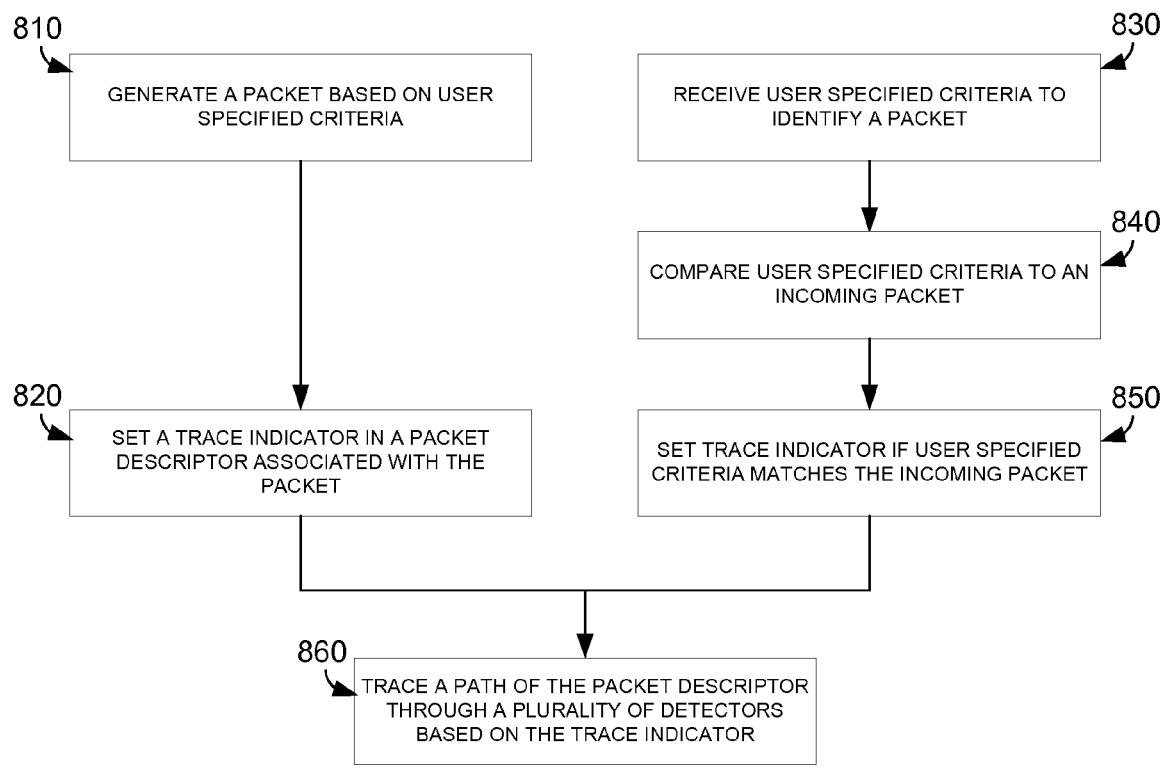
FIG. 8 is an example of a flow diagram for identifying a packet to trace and tracing a packet descriptor.

FIG. 8 is an example of a flow diagram for identifying a packet to trace and tracing a packet descriptor. As described above, there are generally two ways in which a packet to be traced may be received. The first way begins in block 810. In block 810 a packet may be generated based on user specified criteria. In other words, the user specifies the criteria that defines a packet to be traced and the networking device itself generates a packet that matches the specified criteria. In block 820 a trace indicator may be set in the packet descriptor associated with the packet.

The second way of receiving a packet to be traced begins in block 830. In block 830 user criteria to identify a packet may be received. Just as above, the user may specify the type of packet that should be traced. In block 840 incoming packets may be compared to the user specified criteria. For example, packets received from external sources may be compared to the user specified criteria. If a packet is received that matches the user specified criteria, this indicates a packet that should be traced. In block 850 the trace indicator may be set if the user specified criteria matches the incoming packet. In other words, if a packet matching the user specified criteria for tracing is received, the trace indicator is set so that the packet may be traced.

Regardless of how the packet, and thus the packet descriptor, is received, the process moves to block 860. In block 860 the path of the packet descriptor is traced through a plurality of detectors based on the trace indicator. As described above, detectors may be placed in locations of interest within the networking device. The detectors may log packet descriptors that have the trace bit set. By analyzing the log of which detectors detected the presence of a packet descriptor, the detectors that observed the packet descriptor may be determined. By ordering the observations by the timestamp, the path of the packet descriptor through the networking device may be determined. Because the packet descriptor represents the packet, the path of the packet descriptor represents the path the packet traverses on the way through the networking device.

I claim:

1. A method comprising:
   receiving user-specified criteria for a packet;
   creating, based on the user-specified criteria, the packet at a network device;
   storing the packet at a memory location in the network device;
   creating a packet descriptor based on the packet, the packet descriptor being separate from the packet and including a pointer to the memory location, the packet descriptor also storing routing information specifying a source and destination for the packet;
   setting a trace indicator in the packet descriptor; and
   responsive to the setting of the trace indicator and while the packet is stored in the network device, tracing an actual path within the network device of the packet descriptor at least in part by making plural log entries indicating locations within the network device of the packet descriptor and indicating respective times the packet descriptor was at the locations within the network device, each log entry of the plural log entries specifying a respective location of the locations along the actual path within the network device at which a presence of the packet descriptor was detected.

2. The method of claim 1, wherein the times are generated by timestamping detections of the presence at the respective locations of the packet descriptor.

3. The method of claim 1, further comprising incrementing a count in each of the plural log entries as packet descriptors are detected at the respective location.

4. The method of claim 1, further comprising:
   retrieving the log entries from detectors used for detecting the presence of the packet descriptor at the locations; and
   resetting the detectors.

5. The method of claim 1, further comprising:
   detecting, by detectors at the locations, presence of the packet descriptor, wherein a respective presence of the packet descriptor detected at each of the detectors identifies the actual path of the packet descriptor.

6. The method of claim 1, wherein the routing information causes the packet descriptor to traverse an expected path based on a target configuration of the network device.

7. The method of claim 6, further comprising comparing the actual path and the expected path.

8. The method of claim 7, further comprising determining whether or not the network device is correctly configured based on the comparing of the actual path and the expected path.

9. The method of claim 1, wherein the network device comprises a switch including input ports and output ports, the method further comprising:
   routing packets by the switch between the input ports and the output ports.

10. The method of claim 1, wherein the packet descriptor passes through the locations within the network device, without the packet moving through the locations within the network device.

11. A network device comprising:
    a memory to store a packet at a memory location;
    at least one hardware processor couple to the memory to:
    create the packet based on user-specified criteria;
    create a packet descriptor based on the packet and set a trace indicator within the packet descriptor, the packet descriptor being separate from the packet and including a pointer to the memory location of the packet, the packet descriptor including routing information specifying a source and a destination for the packet; and
    trace, while the packet is stored in the memory location, an actual path within the network device of the packet descriptor at least in part by making plural log entries indicating locations within the network device of the packet descriptor and indicating respective times the packet descriptor was at the locations within the network device, each log entry of the plural log entries specifying a respective location of the locations along the actual path within the network device at which a presence of the packet descriptor was detected.

12. The network device of claim 11, further comprising detectors to log timestamps when the trace indicator is set in the packet descriptor.

13. The network device of claim 11, wherein the routing information causes the packet descriptor to traverse an expected path based on a target configuration of the network device.

14. A method comprising:
    identifying a packet to trace, wherein the identifying comprises generating, within a network device, the packet based on user-specified criteria;
    setting a trace indicator in a packet descriptor associated with the packet, the packet descriptor being separate from the packet;
    tracing a path within the network device of the packet descriptor to an output queue of an output port through a plurality of different locations within the network device based on the trace indicator, the tracing involving making log entries, each log entry specifying a respective location within the network device and a respective time that the packet descriptor was located at the respective location; and
    outputting the packet from the output port.

15. The method of claim 14, further comprising:
    storing the packet at a location in a memory of the device, the packet descriptor including a pointer to the location, the packet descriptor also storing routing information specifying a source and a destination for the packet; and
    in response to detection of the packet descriptor at the output queue and prior to outputting the packet, retrieving the packet from the location based on the pointer.

* * * * *